United States Patent
Batt et al.

(10) Patent No.: US 6,534,617 B1
(45) Date of Patent: Mar. 18, 2003

(54) EXTRUDER PROCESS FOR MAKING THERMOPLASTIC POLYURETHANES

(75) Inventors: Alan Michael Batt, Amsterdam (NL); Dale Lee Handlin, Houston, TX (US); Michael Alan Masse, Louvain-la-Neuve (BE); Christinus Cornelis van de Kamp, Hilversum (NL)

(73) Assignee: KRATON Polymers U.S. LLC, Houston, TX (US)

( * ) Notice: Subject to any disclaimer, the term of this patent is extended or adjusted under 35 U.S.C. 154(b) by 0 days.

(21) Appl. No.: 09/444,902

(22) Filed: Nov. 22, 1999

Related U.S. Application Data (60) Provisional application No. 60/110,586, filed on Dec. 2, 1998.

(51) Int. Cl.$^7$ ................................................ C08G 18/65
(52) U.S. Cl. ............................ 528/65; 528/75; 528/85
(58) Field of Search ................................. 528/65, 75, 85

(56) References Cited

U.S. PATENT DOCUMENTS

| | | | |
|---|---|---|---|
| 3,058,955 A | 10/1962 | Neumann et al. | |
| 3,291,859 A | 12/1966 | Tobolsky | |
| 3,304,273 A | 2/1967 | Stamberger | |
| 3,941,855 A | 3/1976 | Ehrhard | |
| 4,242,468 A | 12/1980 | Baack et al. | 521/170 |
| 4,321,343 A | 3/1982 | Rooney | 525/534 |
| 4,883,837 A | 11/1989 | Zabrocki | 525/66 |
| 4,906,673 A | 3/1990 | Mori et al. | 521/131 |
| 5,188,716 A | 2/1993 | Schwerzel et al. | 204/181.7 |
| 5,378,761 A | 1/1995 | St. Clair | 525/111 |
| 5,459,200 A | 10/1995 | St. Clair | |
| 5,554,691 A | 9/1996 | St. Clair | 525/111 |
| 5,580,947 A | 12/1996 | Brahm et al. | 528/75 |

FOREIGN PATENT DOCUMENTS

| | | |
|---|---|---|
| EP | 0732349 A2 | 2/1996 |
| EP | 0823447 A1 | 11/1998 |
| GB | 1577222 | 10/1980 |
| JP | 6-267058 | 9/1994 |
| WO | WO 97/00901 | 1/1997 |
| WO | WO 99/02603 | 1/1999 |

OTHER PUBLICATIONS

International Search Report of Feb. 21, 2000.

*Primary Examiner*—John M. Cooney, Jr.

(57) ABSTRACT

A method of manufacturing a thermoplastic polyurethane having a tensile strength of greater than 20 MPa is described, the method using a co-rotating reaction extruder to react the following:

(i) an isocyanate having two isocyanate groups per molecule;
(ii) a polydiene diol having from 1.6 to about 2 terminal hydroxyl groups per molecule and a number average weight of at least 500 and less than 20,000; and
(iii) one or more chain extenders.

18 Claims, 1 Drawing Sheet

FIG. 1

EXTRUDER PROCESS FOR MAKING THERMOPLASTIC POLYURETHANES

This application claims the benefit of U.S. Provisional Application No. 60/110,586, filed Dec. 2, 1998, the entire disclosure of which is hereby incorporated by reference.

FIELD OF THE INVENTION

This invention relates to thermoplastic polyurethanes. Particularly, although not exclusively, the invention relates to a method of manufacturing thermoplastic polyurethanes.

BACKGROUND OF THE INVENTION

Thermoplastic polyurethanes (TPUs) based on the reaction of polyisocyanates with polymeric diols are well-known for use as elastomers, adhesives, sealants, elastomeric surface coatings, and coatings for metals and plastics. As will be described in detail hereinafter, the polyurethanes of the present invention are based on a polydiene diol, an isocyanate, and a relatively low molecular weight chain extending diol. In this composition the polydiene serves as the soft, rubbery portion of the polyurethane. The diisocyanate and chain extending diol react together to form a rigid segment of the polymer. Because of the reactivity of isocyanates and alcohols, the polydiene is chemically bound at its termini to the hard segments. In this way a segmented block copolymer is formed.

The strength and other physical properties derive from the molecular structure of the segmented block copolymer polyurethane. In their high molecular weight polymerized form, the soft and hard segments are significantly incompatible and segregate into separate domains. In this arrangement the soft segments act as rubbery polymers and they are physically crosslinked through the segregation and vitrification or crystallization of the hard segments. It is important that the incompatibility between hard and soft segments exists in the final high molecular weight form. Without this incompatibility a leathery material would result which would have limited useful applications due to poor low temperature properties and a low upper service temperature.

There are various known methods of manufacturing TPUs. This invention is based on the discovery that TPUs having desirable but unexpected properties can be made using a particular method of manufacture.

SUMMARY OF THE INVENTION

According to a first aspect of the invention, there is provided a method of manufacturing a thermoplastic polyurethane (TPU) from:
(i) a hydrogenated polydiene diol having from 1.6 to about 2 terminal hydroxyl groups per molecule and a number average weight of at least 500 and less then 20,000; and
(ii) an isocyanate having two isocyanate groups per molecule; and
(iii) one or more chain extenders; and
(iv) optionally a catalyst
the method using a co-rotating reaction extruder.

It has surprisingly been found that the method can produce TPUs having unexpectedly advantageous properties. For example, TPUs prepared in the method may have tensile strengths of greater than 20 MPa. Although tensile strengths greater than 20 MPa are common for TPUs based on polar polyols such as polyesters and polyethers, it was believed to be impossible to obtain such high strengths from TPUs based on hydrocarbon polyols.

Said reaction extruder is preferably a multiple screw reaction extruder. Said method using said extruder preferably does not include any solvent. More preferably, the reaction of said isocyanate, said polydiene diol and said chain extender is solvent free.

DETAILED DESCRIPTION OF THE INVENTION

Said isocyanate may be selected from any organic isocyanate previously disclosed as suitable in the preparation of TPUs and includes aliphatic, aromatic and cycloaliphatic disocyanates and mixtures thereof. A variety of aromatic diisocyanates can be used to prepare the thermoplastic polyurethane. However, preferred diisocyanates are not capable of forming a three dimensional network. Therefore, commercial grades of diisocyanates having an isocynate functionality of greater than about 2 are preferably not used. Preferably, the isocyanate functionality of the diisocyanate is in the range of from 1.8 to 2.1, more preferably in the range of from 1.9 to 2.0.

Preferred isocyanates used in the method have a functionality of two isocyanate groups per molecule, since they produce thermoplastic polyurethane compositions when cobmined with a true diol. Examples of suitable diisocyanates include 4,4'-diphenylmethane diisocyanate, 4,4'-dicyclohexylmethane diisocyanate, mixtures of isomers of diphenylmethane diisocyanate, toluene diisocyanate, isophoronediisocyanate, hexamethylenediisocyanate, ethylenediisocyanate, and paraphenyl diisocyanate.

Preferably, the isocyanate is selected from the group 4,4'-diphenylmethane diisocyanate, toluene diisocyanate, isophorone diisocyanate, hexamethylene diisocyanate, ethylenediisocyanate, and paraphenyl diisocyanate. Especially preferred isocyanates are aromatic and preferably include a phenyl group, with 4,4'-diphenylmethane diisocyanate being most preferred.

Suitably, the polydiene diol has 1.7 to 2, preferably 1.8 to 2, more preferably 1.9 to 2, especially 1.92 to 2, terminal hydroxyl groups per molecule. The number average molecular weight (Mn) of the polydiene diol may be at least 500 and, especially, is at least 1000. The number average molecular weight may be less than 20000, is preferably less than 10000, and, especially, is less than 5000.

The polydiene diols typically have hydroxyl equivalent weights between about 250 and about 10,000, preferably between 500 and 5,000. Thus, for di-hydroxy polydiene polymers, suitable peak molecular weights will be between 500 and 20,000, preferably between 1,000 and 10,000, especially 1,000 to 4,000.

The peak molecular weights referred to here are peak molecular weights measured by gel permeation chromatography (GPC) calibrated with polybutadiene standards having known peak molecular weights. These peak molecular weights correspond very closely to the number average molecular weight. The solvent for the GPC analyses is tetrahydrofuran.

The reference above to a said polydiene diol includes within its scope copolymers of alkadienes and other monomers, for example with styrene or other vinyl aromatic monomers. Preferably, however, a said polydiene diol comprises a single polymerized monomeric moiety. The polymer backbone of the polydiene diol, (that is the polydiene) is typically the hydrogenated polymerized product of conjugated diene monomers containing from 4 to 10 carbon atoms, preferably, from 4 to 6 carbon atoms, more preferably butadiene or isoprene, especially butadiene. The polydiene diols used in this invention may conveniently be prepared anionically, e.g. as described in U.S. Pat. Nos. 5,376,745, 5,391,663, 5,393,843, 5,405,911 and 5,416,168 and the contents of the aforementioned patent specifications are incorporated herein by reference.

Polymerization commences with a monolithium or dilithium initiator which builds a living polymer backbone at each lithium site. The conjugated diene is typically 1,3-butadiene or isoprene. The anionic polymerization is effected in solution in an organic solvent, typically a hydrocarbon, for example hexane, cyclohexane or benzene, although polar solvents such as tetrahydrofuran can also be used. When the conjugated diene is 1,3-butadiene and when the resulting polymer is to be hydrogenated, the anionic polymerization of butadiene in a hydrocarbon solvent, for example, cyclohexane, is typically controlled with structure modifiers such as diethylether or glyme (1,2-diethoxyethane) to obtain the desired amount of 1,4-addition. An advantageous balance between low viscosity and high solubility in a hydrogenated polybutadiene polymer occurs at a 60/40 ratio of 1,4-butadiene/1,2-butadiene. This butadiene microstructure is achieved during polymerization at 50° C. in cyclohexane containing about 6% by volume of diethylether or about 100 ppm of glyme.

Anionic polymerization is terminated by addition of a functionalizing agent, e.g. as described in U.S. Pat. Nos. 5,391,637, 5,393,843 and 5,418,296 (which are herein incorporated by reference), but preferably ethylene oxide, prior to termination.

The preferred di-lithium initiator is formed by reaction of two moles of sec-butyllithium with one mole of diisopropenylbenzene. This diinitiator is used to polymerize butadiene in a solvent composed of 90% wt cyclohexane and 10% wt diethylether. The molar ratio of diinitiator to monomer determines the molecular weight of the polymer. The living polymer is then capped with two moles of ethylene oxide and terminated with two moles of methanol to yield the desired polydiene diol.

The polydiene diol can also be made using a monolithium initiator which contains a hydroxyl group which has been blocked as the silyl ether (e.g. as in U.S. Pat. Nos. 5,376,745 and 5,416,168). A suitable initiator is hydroxypropyllithium in which the hydroxyl group is blocked as the trimethylsilyl ether. This mono-lithium initiator can be used to polymerize butadiene in hydrocarbon or polar solvents. The molar ratio of initiator to monomer determines the molecular weight of the polymer. The living polymer is then capped with one mole of ethylene oxide and terminated with one mole of methanol to yield the mono-hydroxy polydiene polymer. The silyl ether is then removed by acid catalyzed cleavage in the presence of water, yielding the desired dihydroxy polydiene diol.

Said polydiene diol, especially a polybutadiene diol, is preferably hydrogenated such that at least 90%, preferably at least 95%, of the carbon to carbon double bonds in the diols are saturated. Hydrogenation may be carried out by a variety of well established processes including hydrogenation in the presence of such catalysts as Raney Nickel, nobel metals such as platinum and the like, soluble transition metal catalysts and titanium catalysts, e.g. as in U.S. Pat. No. 5,039,755, which is herein incorporated by reference. A particularly preferred catalyst is a mixture of nickel 2-ethylhexanoate and triethylaluminium.

When said polydiene diol is a polybutadiene diol, the polybutadiene preferably has no less than about 30% 1,2-butadiene addition because, after hydrogenation, the polybutadiene polymer will be a waxy solid at ambient temperature if it contained less than about 30% 1,2-butadiene addition. To minimize viscosity of the polydiene diol, the 1,2-butadiene content is preferably between about 40 and 60%. Where said polydiene diol is based on an isoprene polymer, such polymers preferably have no less than 80% 1,4-isoprene addition in order to reduce Tg and viscosity. The aforementioned diene microstructures are typically determined by $^{13}C$ nuclear magnetic resonance (NMR) in chloroform. Said polydiene diol is preferably substantially apolar.

Said chain extender is typically a low molecular weight (suitably of less than 400, preferably less than 300) hydrocarbon containing two functional groups capable of reacting with the diisocyanate. Preferably, the chain extender is an aliphatic or cycloaliphatic compound containing up to 15 carbon atoms and having two functional groups selected from hydroxy and amine groups. The number of carbon atoms present in the chain extender preferably ranges from 1 to 14, more preferably from 2 to 8. Preferably, the chain extender is a diol or a diamine, for example a diol selected from the group consisting of ethylene glycol, 1,2-propane diol, 1,6-hexane diol, 1,4-dihydroxycyclohexane and 1,4-butane diol, or a diamine selected from ethylene diamine, 4,4'-methylene bis(o-chloro aniline), 4,4'-diamino diphenylmethane, p-phenylene diamine, and derivatives thereof. Most preferably, the chain extender is a diol, preferably a saturated aliphatic diol, with 1,4-butane diol and 2-ethyl-2-butyl-1,3-propane diol being especially preferred.

Mixtures of chain extenders may be used and these may be selected from any of the chain extenders described herein. For example, a mixture comprising ethylene glycol and 1,4-butane diol may be used. Preferably, however, only one chain extender is used.

The molar ratio of isocyanate (NCO) moieties in the reactants to hydroxyl (OH) and amine ($NH_2$) moieties in the reactants may be at least 0.85, is preferably at least 0.90 and is more preferably at least 0.91. Said ratio may be less than 1.2, preferably less than 1.15, more preferably less than 1.10, especially less than 1.05.

A catalyst may be used in the method of manufacturing said TPU. Suitable catalysts may be selected from organic and inorganic acid salts of, and organometallic derivatives of bismuth, lead, tin, iron, antimony, uranium, cadmium, cobalt, thorium, aluminium, mercury, zinc, nickel, cerium, molybdenum, vanadium, copper, titanium, manganese and zirconium, as well as phosphines and tertiary organic amines. Preferred organotin catalysts are stannous octoate, stannous oleate, dibutyltin dioctoate, dibutyltin dilaurate, and the like. Preferred tertiary organic amine catalysts are triethylamine, triethylenediamine, N,N,N',N'-tetramethylethylenediamine, N,N,N',N'-tetraethylethylenediamine, N-methylmorpholine, N-ethylmorpholine, N,N,N',N'-tetramethylguanidine, N,N,N',N'-tetramethyl-1,3-butanediamine, N,N-dimethylethanolamine, N,N-diethylethanolamine and the like. The amount of catalyst employed in the method is generally within the range of about 0.005 to about 2.0 wt % based on the total weight of the reactants.

Said TPU manufactured in the method may have hard segments of less than 50wt %, preferably less than 40wt %, more preferably less than 35wt %, especially less than 32wt % and more especially less than 30wt %. Said TPU may have at least 15wt %, preferably at least 18wt %, more preferably at least 20wt % hard segments.

Said TPU manufactured in the method may have a tensile strength of at least 20 MPa, preferably at least 22 MPa, more preferably at least 24 MPa. In some circumstances, TPUs can be made having tensile strengths of greater than 30 MPa or even 35 MPa. The tensile strength of said TPUs is generally less than 50 MPa. The elongation at break of said TPU may be at least 300%, preferably at least 400%, more preferably at least 500%, especially at least 550%. Tensile strengths and elongations may suitably be assessed according to DIN53504 specimen S3a on dumb bells which are punched from cast films.

Said TPU is preferably substantially soluble in a solution comprising tetrahydrofuran/dimethylacetamide in the weight ratio 76:10. Said TPU is preferably substantially homogenous.

Said polydiene diol and said chain extender are preferably substantially immiscible. This means that two layers form after vigorous mixing and standing for 24 hours.

In the method, polymerization of some of the reactants may be effected before use of the reaction extruder. For example, a prepolymer may be prepared, suitably in a solvent-less prepolymer method. In such a method, some, or preferably all, of the isocyanate is mixed with some, or preferably all, of the polydiene diol at an elevated temperature, typically in the range 70° to 100° C., for a period of at least 30 minutes or even more, and under an inert atmosphere, for example a nitrogen atmosphere. A prepolymer, heated to a temperature in the range 30 to 70° C., preferably 40 to 60° C. may then be fed to an inlet of said reaction extruder. A said extender, which may be heated, but which is suitably at ambient temperature, may also be fed into an inlet, suitably the same inlet, of said reaction extruder at this stage. The temperature of the reactants in said extruder suitably does not exceed 270° C., preferably does not exceed 250° C., more preferably does not exceed 240° C. and, especially, does not exceed about 230° C.

A suitable co-rotating reaction extruder is a twin-screw extruder comprising a series of kneading/mixing zones separated by conveying screws. Steps may need to be taken to increase the residence time of the reactants in the extruder in order to produce TPUs having the desired properties. This may easily be carried out by a person skilled in the art, for example by including a length of reverse pitch conveying/mixing zones in a region of the extruder.

According to a second aspect of the invention there is provided a thermoplastic polyurethane prepared or preparable in a method according to said first aspect.

EXAMPLES

The invention will now be described, by way of example, with reference to FIG. 1 which is a schematic diagram showing the screw design and barrel heating zones of an extruder used. The positions of thermocouples numbered 1, 2, 4 to 13 and 15 to 17 are shown; various zones are shown; the screw sections are described in the format A/B where A is the pitch of screw in mm and B is the length of the section in mm; and KB refers to "Kneading Block".

The following are referred to hereinafter:

L-2203—refers to a linear, hydrogenated butadiene diol polymer having 1.92 terminal hydroxyl groups per molecule, an equivalent weight of 1660 and a 1,2-addition of butadiene of 53%, obtained from Shell Chemical Company U.S.A., labelled KLP-L2203. This polymer is a viscous liquid at 25° C. but flows readily at slightly elevated temperatures (2.5 Pa.s (2500 centipoise) viscosity at 60° C.)

MDI—refers to 4,4'-diphenylmethane diisocyanate (Cas No. 101-68-8) sold under the trade mark Lupranet MES by BASF. To prevent dimerisation of the MDI, 40 kg containers of pure MDI were stored at −20° C. and 1 kg samples taken from these containers for use within a few days were stored at 5° C. To prevent water condensing on the MDI, the contents of the containers were allowed to warm to room temperature before opening and the atmosphere above the containers was swept with dry nitrogen before resealing. The MDI used in all of the procedures melted at about 40° C. to give a clear, slightly yellow liquid which is an indication that the MDI contained at most very small amounts of dimer and urea. The equivalent weight of the MDI was taken to be 125 in all calculations.

Irganox 1010—a hindered phenol anti-oxidant supplied by Ciba-Geigy.

Figure 1:
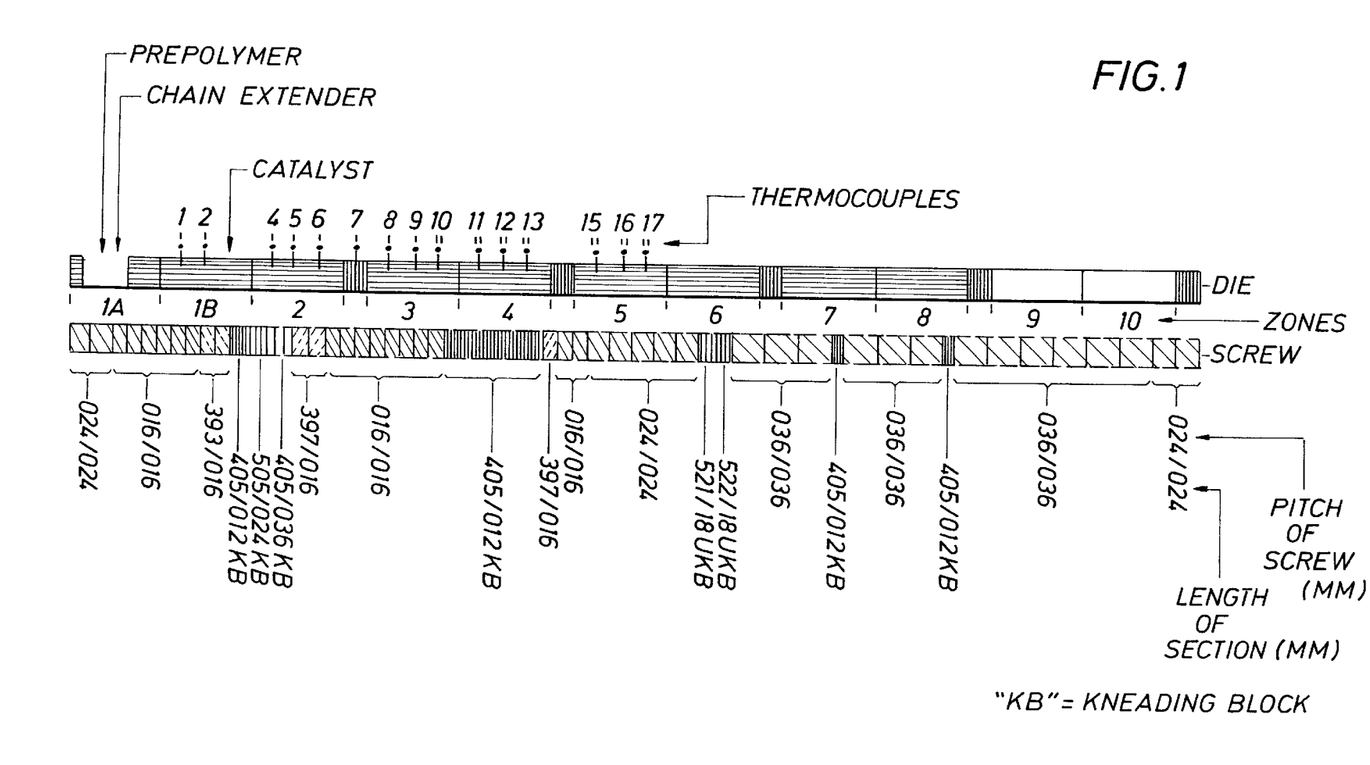
FIG. 1 is a schematic of the extruder used in the examples.

ZSK 25 extruder—refers to a co-rotating twin-screw extruder supplied by Werner & Pfeiderer having a screw design and barrel heating zone as shown in FIG. 1. The screw design consisted of a series of kneading/mixing zones separated by conveying screws. To increase the residence time of reacting materials, the first two kneading zones were succeeded by a short length of reverse pitch conveying/mixing zones.

BD—refers to 1,4-butane diol (CAS Nr 110-63-4) obtained from Aldrich Chemical Company. It was dried by heating under a vacuum of less than 10 mbar at 100° C. for at least one hour before use, unless otherwise stated. The equivalent weight was taken as 45.06 in all calculations.

BEPD—refers to 2-ethyl-2-butyl-1,3-propane diol (CAS No. 115-84-4) obtained from Perstorp. It was dried for 1 hour at 120° C. at less than 10 mbar before use, unless otherwise stated. The equivalent weight was taken as 80.13 in all calculations.

TMPD—refers to 2,2,4-trimethyl-1,3-pentane diol supplied by Eastman Chemicals. It was dried at 100° C. at less than 10 mbar for more than one hour before use.

DBTL—refers to dibutyl tin dilaurate catalyst (CAS Nr. 77-58-7) obtained from Air Products under the trade mark DABCO-T-12CL. It was used diluted with polypropylene glycol of molecular weight 2000 (PPG 2000 obtained from Shell International Chemicals). For the purposes of calculating the stoichiometry of the reaction, the hydroxyl groups present in this catalyst stream were ignored.

Examples 1 to 19 hereinafter relate to the present invention. Examples C1 to C7 are included for comparison purposes.

Example 1
General Procedure for Preparation of Prepolymer

Prepolymer was made in a 9 liter stainless steel reactor by adding solid MDI flakes to the heated and stirred L-2203 which contained 0.3% wt of Irganox 1010. The reactor was fitted with a ribbon stirrer reaching from its top to its bottom. The space above the reactants was filled with dry nitrogen gas. It should be noted that, in the procedure, all of the MDI used in the preparation of the ultimate thermoplastic polyurethane (TPU) was reacted with all of the L-2203 used in the preparation of the ultimate TPU to result in a mixture of unreacted MDI, L-2203 which had reacted at each end of the molecule with an MDI molecule and short chains formed by reaction of the latter reaction products with more isocyanate and more L-2203 diol. If the MDI is represented by "A" and the long chain diol by "B", species found in the prepolymer can be written as "A", "ABA", "ABABA", "ABABABA" etc.

Example 2
General Procedure for Preparation of TPU

Heated prepolymer prepared as described in Example 1 and a "chain extender" selected from BD and BEPD were fed to the inlet of the ZSK25 co-rotating twin-screw extruder. The catalyst, DBTL, was added immediately prior to the first kneading/mixing zone, as shown in FIG. 1. Formulation variables in the examples were the hard phase content of the elastomer, the isocyanate to hydroxyl group ration (NCO:OH ratio), type of chain extender and catalyst level. Machine variables included variations in set temperatures along the extruder barrel and screw rotation speed.

Examples 3 to 19
Specific Examples

The prepolymers for each Example were prepared following the general procedure of Example 1 and having the specific preparatory conditions as described in Table 1.

The TPU's of the Examples were prepared using the procedure described in Example 2 from the prepolymers described in Table 1 using the conditions described in Table 2. Tables 3 and 4 give details on extruder parameters used in the procedures for the Examples. In Table 3 the number of zones correspond to the zones labelled in FIG. 1.

TABLE 1

| | | Prepolymer preparation conditions | | | | | | Analysis | |
|---|---|---|---|---|---|---|---|---|---|
| Example No. | Chain extender | L-2203 intake, kg | L-2203 temp. °C. | MDI intake, kg | MDI temp. °C. | Cure temp °C. | Cure time mins | NCO content, theory % wt | NCO content, actual % wt |
| 3 | BD | 4.236 | 70 | 0.913 | 23 | 90 | 60 | 3.88 | 3.78 |
| 4 | BD | 3.328 | 70 | 0.676 | 23 | 90 | 60 | 3.57 | |
| 5 | BD | 3.328 | 70 | 0.676 | 23 | 90 | 60 | 3.57 | |
| 6 | BD | 3.328 | 70 | 0.676 | 23 | 90 | 60 | 3.57 | |
| 7 | BD | 5.109 | 70 | 1.039 | 23 | 90 | 60 | 3.58 | 3.45 |
| 8 | BD | 5.109 | 70 | 1.039 | 23 | 90 | 60 | 3.58 | 3.45 |
| 9 | BD | 4.867 | 70 | 0.988 | 23 | 90 | 60 | 3.57 | 3.51 |
| 10 | BD | 4.867 | 70 | 0.988 | 23 | 90 | 60 | 3.57 | 3.51 |
| 11 | BD | 4.867 | 70 | 0.988 | 23 | 90 | 60 | 3.57 | 3.51 |
| 12 | BD | 4.241 | 70 | 1.126 | 23 | 90 | 60 | 5.05 | |
| 13 | BD | 4.241 | 70 | 1.126 | 23 | 90 | 60 | 5.05 | |
| 14 | BD | 4.241 | 70 | 1.126 | 23 | 90 | 60 | 5.05 | |
| 15 | BD | 4.206 | 70 | 1.117 | 23 | 90 | 60 | 5.05 | |
| 16 | BD | 4.007 | 70 | 1.367 | 23 | 90 | 60 | 6.66 | |
| 17 | BD | 4.005 | 70 | 1.348 | 23 | 90 | 60 | 6.57 | 6.44 |
| 18 | BEPD | 4.118 | 70 | 1.191 | 23 | 90 | 60 | 5.58 | 5.49 |
| 19 | BEPD | 4.118 | 70 | 1.191 | 23 | 90 | 60 | 5.58 | 5.49 |
| C5 | BD | 218.2 | 85 | 44.45 | 56 | 85 | 90 | 3.58 | 3.54 |
| C6 | TMPD | 217.7 | 90 | 63.96 | 56 | 95 | 100 | 5.66 | 5.69 |
| C7 | BEPD | 217.7 | 90 | 63.96 | 56 | 95 | 100 | 5.66 | 5.69 |
| C1 | BD | 0.4013 | 70 | 0.08105 | 70 | 90 | 90 | 3.62 | — |
| C2 | BEPD | 0.3717 | 90 | 0.1080 | 23 | 90 | 60 | 5.68 | — |

TABLE 2

| | TPU production conditions | | | | | | |
|---|---|---|---|---|---|---|---|
| Example No. | Prepolymer temp. °C. | Prepolymer flow rate, kg/min | Chain extender temp., °C. | Chain extender flow rate, kg/min | DBTL concn. % wt on PPG2000 | DBTL stream flow rate ml/min | TPU post cure temp (°C.)/ time (hr) |
| 3 | 50 | 0.03367 | 23 | 0.0148 | 0.3 | 0.542 | none |
| 4 | 50 | 0.03383 | 23 | 0.0128 | 0.3 | 0.542 | none |
| 5 | 50 | 0.03400 | 23 | 0.0103 | 0.3 | 0.747 | none |
| 6 | 50 | 0.03367 | 23 | 0.0127 | 0.3 | 0.747 | nbne |
| 7 | 50 | 0.03267 | 23 | 0.0137 | 0.3 | 0.753 | none |
| 8 | 50 | 0.03350 | 23 | 0.0137 | 0.3 | 0.750 | none |
| 9 | 50 | 0.03333 | 23 | 0.0123 | 0.3 | 0.750 | none |
| 10 | 50 | 0.03333 | 23 | 0.0123 | 0.3 | 0.750 | none |
| 11 | 50 | 0.03333 | 23 | 0.0120 | 0.3 | 0.611 | none |
| 12 | 50 | 0.02960 | 23 | 0.0166 | 0.3 | 0.727 | none |
| 13 | 50 | 0.02933 | 23 | 0.0158 | 0.3 | 0.727 | none |
| 14 | 50 | 0.02917 | 23 | 0.0158 | 0.3 | 0.727 | none |
| 15 | 50 | 0.03042 | 23 | 0.0152 | 0.3 | 0.727 | none |
| 16 | 50 | 0.03144 | 23 | 0.0214 | 1.0 | 0.330 | none |
| 17 | 50 | 0.03114 | 23 | 0.0205 | 1.0 | 0.263 | none |
| 18 | 50 | 0.03018 | 50 | 0.0356 | 1.0 | 0.413 | none |

TABLE 2-continued

TPU production conditions

| Example No. | Prepolymer temp. ° C. | Prepolymer flow rate, kg/min | Chain extender temp., ° C. | Chain extender flow rate, kg/min | DBTL concn. % wt on PPG2000 | DBTL stream flow rate ml/min | TPU post cure temp (° C.)/ time (hr) |
|---|---|---|---|---|---|---|---|
| 19 | 50 | 0.02988 | 50 | 0.0325 | 1.0 | 0.407 | none |
| C5 | 124 | 9.095 | 23 | 0.341 | — | 0 | 110/16 |
| C6 | 125 | 13.61 | 88 | 1.334 | — | 0 | 110/16 |
| C7 | 125 | 12.95 | 88 | 1.402 | — | 0 | 110/16 |
| C1 | 90 | 0.09625 (instant) | 80 | 0.00366 (instant) | — | 0 | 80/16 |
| C2 | 90 | 0.4800 instant | 90 | 0.05225 instant | — | 0 | 70/16 |

TABLE 3

Process temperatures for the "ZSK 25" twin-screw extruder

Extruder barrel temperature ° C.

| TPU Example No. | Zone 1A set | Zone 1B set | actual 1 | actual 2 | Zone 2 set | actual 4 | actual 5 | actual 6 | Inter actual 7 | Zone 3 set | actual 8 | actual 9 | Zone 4 set | actual 12 | actual 13 |
|---|---|---|---|---|---|---|---|---|---|---|---|---|---|---|---|
| 3 | 50 | 110 | 77 | 96 | 180 | 148 | 160 | 170 | 176 | 180 | 181 | 184 | 200 | 207 | 207 |
| 4 | 50 | 110 | 76 | 96 | 180 | 153 | 166 | 172 | 177 | 180 | 180 | 183 | 200 | 201 | 203 |
| 5 | 50 | 110 | 75 | 98 | 180 | 157 | 166 | 175 | 179 | 180 | 183 | 185 | 200 | 203 | 205 |
| 6 | 50 | 110 | 74 | 98 | 180 | 160 | 170 | 179 | 181 | 180 | 185 | 189 | 200 | 211 | 210 |
| 7 | 50 | 50 | 56 | 58 | 180 | 115 | 144 | 169 | 175 | 180 | 179 | 183 | 200 | 208 | 209 |
| 8 | 50 | 50 | 56 | 60 | 180 | 120 | 150 | 170 | 181 | 180 | 187 | 191 | 200 | 218 | 215 |
| 9 | 50 | 50 | 56 | 58 | 180 | 127 | 154 | 171 | 180 | 180 | 186 | 192 | 200 | 219 | 218 |
| 10 | 50 | 50 | 54 | 58 | 180 | 114 | 146 | 161 | 174 | 180 | 178 | 181 | 200 | 202 | 204 |
| 11 | 50 | 50 | 55 | 58 | 180 | 131 | 158 | 173 | 180 | 180 | 185 | 189 | 200 | 214 | 214 |
| 12 | 50 | 50 | 56 | 60 | 180 | 143 | 174 | 203 | 193 | 180 | 198 | 202 | 200 | 230 | 223 |
| 13 | 50 | 50 | 56 | 60 | 180 | 143 | 171 | 200 | 189 | 180 | 190 | 195 | 190 | 225 | 221 |
| 14 | 50 | 50 | 54 | 57 | 180 | 136 | 160 | 182 | 186 | 180 | 191 | 194 | 190 | 219 | 211 |
| 15 | 50 | 50 | 53 | 56 | 180 | 138 | 162 | 179 | 184 | 180 | 190 | 194 | 190 | 214 | 209 |
| 16 | 50 | 50 | 51 | 54 | 180 | 134 | 161 | 178 | 183 | 180 | 187 | 191 | 190 | 220 | 220 |
| 17 | 50 | 50 | 54 | 57 | 180 | 145 | 170 | 193 | 186 | 180 | 188 | 191 | 190 | 216 | 215 |
| 18 | 70 | 50 | 57 | 55 | 180 | 113 | 142 | 162 | 174 | 180 | 180 | 184 | 190 | 193 | 196 |
| 19 | 70 | 50 | 57 | 55 | 180 | 112 | 142 | 162 | 174 | 180 | 181 | 185 | 190 | 193 | 198 |

Extruder barrel temperature ° C.

| TPU Example No. | Inter actual 14 | Zone 5 set | actual 15 | actual 16 | set | Zones 6–10 set | | | | Die plate set |
|---|---|---|---|---|---|---|---|---|---|---|
| 3 | 205 | 200 | 206 | 205 | 200 | 190 | 180 | 170 | 160 | 150 |
| 4 | 204 | 200 | 206 | 206 | 200 | 190 | 180 | 170 | 170 | 180 |
| 5 | 204 | 200 | 206 | 206 | 200 | 190 | 180 | 170 | 170 | 175 |
| 6 | 207 | 200 | 210 | 209 | 200 | 190 | 180 | 170 | 170 | 188 |
| 7 | 206 | 200 | 209 | 208 | 200 | 190 | 180 | 170 | 170 | 180 |
| 8 | 211 | 200 | 213 | 212 | 200 | 190 | 180 | 170 | 170 | 180 |
| 9 | 213 | 200 | 216 | 215 | 200 | 190 | 180 | 170 | 170 | 180 |
| 10 | 204 | 200 | 206 | 206 | 200 | 190 | 180 | 170 | 170 | 180 |
| 11 | 211 | 200 | 213 | 212 | 200 | 190 | 180 | 170 | 170 | 180 |
| 12 | 216 | 200 | 219 | 217 | 200 | 190 | 180 | 170 | 170 | 180 |
| 13 | 215 | 195 | 217 | 218 | 200 | 190 | 180 | 170 | 170 | 180 |
| 14 | 207 | 195 | 210 | 210 | 200 | 190 | 180 | 170 | 170 | 180 |
| 15 | 207 | 195 | 210 | 210 | 200 | 190 | 180 | 170 | 170 | 180 |
| 16 | 211 | 195 | 212 | 211 | 200 | 190 | 180 | 170 | 170 | 185 |
| 17 | 209 | 195 | 213 | 212 | 200 | 190 | 180 | 170 | 170 | 195 |
| 18 | 196 | 195 | 199 | 200 | 200 | 190 | 180 | 170 | 170 | 170 |
| 19 | 198 | 195 | 202 | 204 | 200 | 190 | 180 | 170 | 170 | 170 |

TABLE 4

Process conditions for the "ZSK 25" twin-screw extruder

| Example No. | Screw rotation speed rpm | Die pressure bar | Torque % |
|---|---|---|---|
| 3 | 100 | 45 | 33 |
| 4 | 100 | 22 | 26 |
| 5 | 100 | — | — |
| 6 | 100 | 15 | 32 |
| 7 | 100 | 8 | 25 |
| 8 | 200 | 7 | 26 |
| 9 | 200 | 18 | 31 |
| 10 | 50 | 35 | 38 |
| 11 | 300 | 7 | 28 |
| 12 | 300 | 16 | 32 |
| 13 | 200 | 22 | 33 |
| 14 | 200 | 31 | 38 |
| 15 | 200 | 12 | 36 |
| 16 | 200 | — | — |
| 17 | 200 | 20 | 33 |
| 18 | 200 | 4 | 16 |
| 19 | 200 | 15 | 24 |

Analysis (i) Isocyanate (NCO) Content of Prepolymer

This was determined using ASTM method D2572. Results are provided in Table 1.

(ii) Hard Phase Content of the TPU

This is defined as the total weight of isocyanate plus chain extender divided by the total weight of all ingredients of TPU, expressed as a percentage. Results are provided in Table 5.

(iii) Solubility of the TPU

This was determined by rolling a specified weight of TPU in a specified amount of a stated solvent (or a mixture of solvents) for at least 24 hours. Solubility was assessed visually. For those TPU's which were judged "soluble" in the solvent, the fraction of the TPU present as often visible "gels" was determined by straining the solution through a tray made of stainless steel wire cloth obtained from Metaalgaas, Twente, the Netherlands. The cloth had aperture 0.075 mm, wire diameter 0.050 mm and mesh count 200× 200 (conforms to NEN 2560). The amount of insoluble material was calculated from the increase in weight of the dried cloth. The method is accurate to about 1% of the original weight of the elastomer assessed. Results of provided in Table 5. The solubility of a TPU is. considered to be a measure of the amount of high molecular weight cross-linked "gels" present in the elastomer. These "gels" are insoluble in any solvent. If the TPU is significantly cross-linked, for example by allophanate or isocyanurate bond formation, it is insoluble in the solvents used in these experiments.

TABLE 5

Solubility of TPU based on KRATON Liquid Diol L-2203
4 g rubber dissolved in the weight of solvent shown
"S" = soluble, "NS" = not soluble; Values in brackets are the % wt insoluble material in the rubber

| Example No | Hard phase content % wt | NCO: OH group ratio | THF | THF/DMF 76/10 w | THF/DMF 76/20 w | THF/DMA 76/30 w | THF/DMA 76/20 w | THF/DMA 76/30 w | THF/DMA 60/40 w | THF/DMA 40/40 w | MEK/DMF 50/50 w | Tol/MEK 50/50 w |
|---|---|---|---|---|---|---|---|---|---|---|---|---|
| 3 | 21.3 | 0.947 | S(1.5) | S(<1) | | S(1.0) | S(2.0) | S(1.0) | NS | NS | | NS |
| 4 | 19.9 | 1.004 | NS | S(<1) | | S(<1) | S(1.5) | S(1.0) | NS | NS | | NS |
| 5 | 19.4 | 1.145 | NS | NS | NS | NS | NS | NS | NS | NS | | NS |
| 6 | 19.9 | 1.011 | S(<1) | | | S(<1) | | | NS | NS | | NS |
| 7 | 20.3 | 0.929 | S(1.3) | | | S(1.0) | | | | | | |
| 8 | 20.3 | 0.941 | S(<1) | S(<1) | | S(<1) | | | | | | |
| 9 | 19.9 | 1.012 | NS | S(<1) | | S(1.0) | | | | | NS | NS |
| 10 | 19.9 | 1.012 | NS | | | S(<1) | | | | | NS | NS |
| 11 | 19.7 | 1.033 | NS | NS | | S(1.0) | | | | | NS | NS |
| 12 | 25.4 | 0.931 | S(<1) | S(<1) | | S(<1) | | | | | | |
| 13 | 25.3 | 0.963 | NS | S(1.3) | | S(<1) | | | | | | |
| 14 | 25.3 | 0.955 | NS | S(<1) | | S(<1) | | | | | | |
| 15 | 25.0 | 1.000 | NS | S(<1) | | S(<1) | | | | | | |
| 16 | 30.4 | 1.004 | NS | S(1.0) | | S(<1) | S(2.5) | S(2.0) | NS | NS | | |
| 17 | 29.9 | 1.039 | NS | NS | NS | NS | NS | NS | NS | NS | | |
| 18 | 30.7 | 0.914 | S(<1) | S(<1) | | S(<1) | S(1.0) | | NS | NS | | |
| 19 | 30.2 | 0.972 | S(<1) | S(<1) | | S(<1) | S(1.0) | | NS | NS | | |
| C5 | 20.0 | 1.02 | NS | NS | NS | NS | NS | NS | NS | NS | | |
| C6 | 30.0 | 1.00 | NS | NS | NS | NS | NS | NS | NS | NS | NS | NS |
| C7 | 30.6 | 1.00 | NS | NS | NS | NS | NS | NS | NS | NS | | |
| C1 | 19.8 | 1.02 | NS | | | NS | NS | NS | NS | NS | | |
| C2 | 30.1 | 1.00 | S | | | S | S | S | NS | NS | | |

"BD" 1,4-butane diol; "BEPD" = 2-butyl-2ethyl-1,3-propane diol; "TMPD" = 2,2,4-trimethyl-1,3-pentane diol
THF = tetrahydrofuran; DMF - dimethyllformamide; DMA - dimethylacetamide; MEK - methyl ethyl ketone; Tol = toluene

TABLE 6

GPC Analaysis of TPU
Samples dissolved in THF, unless otherwise stated (then 90/10 THF/DMF). All molecular weights (MW) calculated as if polystyrene.

| | GPC method | Region of the GPC curve | | | | | | |
|---|---|---|---|---|---|---|---|---|
| | Solution or | Low MW | | Main peak | | | High MW | |
| Example No | Extraction | MW range | % of total area | MW range | Peak MW | % of total area | MW range | % of total area |
| 3 | Solution | 180–3800 | 1.4 | 3900–2 × $10^6$ | 93000 | 98.6 | >2 × $10^6$ | 0 |
| 4 | Extraction | 90–2600 | 0.9 | 2600–1.7 × $10^6$ | 128000 | 95.2 | >2 × $10^6$ | $3.8^1$ (peak) |
| 5 | Extraction | 90–3000 | 0.9 | 3100–1.7 × $10^6$ | 134000 | 94.6 | >2 × $10^6$ | $4.5^1$ (peak) |
| 6 | Solution | 140–3900 | 2.2 | 3900–1.8 × $10^6$ | 62000 | 97.6 | >2 × $10^6$ | 0 |
| 7 | Solution | 220–4800 | 6.5 | 4800–2 × $10^6$ | 55000 | 93.5 | >2 × $10^6$ | 0 |
| 8 | Solution | 190–5200 | 5.8 | 5200–2 × $10^6$ | 52000 | 94.2 | >2 × $10^6$ | 0 |
| 9 | Extraction | 370–3400 | 1.1 | 3400–2 × $10^6$ | 126000 | 98.9 | >2 × $10^6$ | $NS^1$ |
| 10 | Extraction | 330–3500 | 0.6 | 3600–2 × $10^6$ | 135000 | 99.4 | >2 × $10^6$ | $NS^1$ |
| 11 | Extraction | 360–2600 | 0.5 | 2600–2 × $10^6$ | 158000 | 99.5 | >2 × $10^6$ | $NS^1$ |
| 12 | Solution | 180–4400 | 3.5 | 4400–303000 | 48000 | 95.8 | >305000 | 0.7 (tail) |
| 13 | Extraction | 190–3400 | 2.8 | 34000–696000 | 68000 | 95.2 | >696000 | $2.0^1$ (tail) |
| 14 | Extraction | 310–3700 | 1.9 | 3700–696000 | 76000 | 95.0 | >686000 | $3.1^1$ (peak) |
| 15 | Extraction | 300–8700 | 4.4 | 8800–2 × $10^6$ | 128000 | 95.6 | >2 × $10^6$ | $NS^1$ |
| 16 | Solution in THF/DMF | 10–2300 | 0.8 | 2300–2 × $10^6$ | 187000 | 99.2 | >2 × $10^6$ | 0 |
| 17 | Solution in THF/DMF | 10–2100 | 1.4 | 2100–2 × $10^6$ | 162000 | 98.6 | >2 × 10 | 0 |
| 18 | Solution | 10–4800 | ca 1 | 4800–1 × $10^6$ | 48000 | ca 99 | >1 × $10^6$ | 0 |
| 19 | Solution | 10–4100 | ca 4 | 4100–1 × $10^6$ | 70000 | ca 96 | >1 × $10^6$ | 0 |
| C5 | Extraction | 360–16700 | 71.7 | 16700–2 × $10^6$ | 63000 | 28.2 | >2 × $10^6$ | $NS^1$ |
| C6 | Extraction | 240–4100 | 9.3 | 4100–2 × $10^6$ | 19000 | 90.7 | >2 × $10^6$ | $NS^1$ |
| C7 | Extraction | 290–3700 | 1.4 | 3700–2 × $10^6$ | 77000 | 98.6 | >2 × $10^6$ | $NS^1$ |
| C1 | Extraction | 260–14400 | 40.8 | 14400–830000 | 93000 | 53.5 | >830000 | $5.7^1$ (peak) |
| C2 | Solution | 320–28600 | ca. 15 | 28600–1.8 × $10^6$ | 106000 | ca. 85 | >1.8 × $10^6$ | 0 |

[1]Insoluble fraction expected to be composed of higher molecular weight (possibly allophanate crosslinked) material.

(iv) Determination of Molecular Weight of the TPU by Gel Permeation Chromatography (GPC)

10 mg of TPU was dissolved in—or, if the elastomer was insoluble, extracted by—10 ml of tetrahydrofuran or a 90/10 wt mixture of tetrahydrofuran/dimethylformamide. The solvent contained one drop of n-butylamine to react with any free isocyanate groups which might have been present. After filtering through a 0.5 micron Millipore filter, 20 microlitres of the resultant solution/extraction was injected into the Gel Permeation Chromatography (GPC) apparatus. The latter contained two 30 cm long "PL gel" columns in series composed of material containing 10,000 and 500 Angstrom pore size respectively. The eluent (mobile phrase) was THF and the mobile phase flow rate was 0.8 ml/minute. The species separated by the chromatograph are detected as they pass through a UV detection unit.

The GPC is used to give an indication of the peak molecular weight (MW) and of the molecular weight distribution of polyurethane elastomers. The apparatus is calibrated with commercially available polystyrenes of known molecular weight and the results are interpreted as if the elastomer were based on polystyrene. Molecular weights of TPUs determined by this means are therefore indications only. The method is semi-quantitative for species with molecular weight in the range about 500 to 1 million. In the tables of results provided in Table 6, the curve of UV response against molecular weight is divided into three sections: the main peak and "tails" or peaks at both the high and low molecular weight end of this main peak.

(v) Melt Flow Index (MFI) of TPU

This was determined manually according to a variation on ASTM method 1238/ISO 1133. After a TPU had been packed into the heated cylinder, which was at the specified temperature, the sample was compressed for 1 minute by placing the specified load on the compression piston. The load was then removed and the sample allowed to warm up to the temperature of the cylinder for a further 3 minutes. The load was subsequently replaced and the measurements commenced at the beginning of the fourth minute. The average flow rate through the die was determined over the subsequent 3 minutes or until the upper gauge mark reached the top of the cylinder, whichever occurred earliest. Results are provided in Table 7.

TABLE 7

Melt Behaviour of TPU

| TPU | Melt Flow Rate 180° C./ 5 kg | Melt Flow Rate 200° C./ 5 kg | Melt Flow Rate 200° C./ 12.5 kg | Appearance as made | Milling conditions Minimum temperature ° C. | Mill time at minimum temperature min | Appearance after milling |
|---|---|---|---|---|---|---|---|
| 3 | 0 | | 4 | 6 | clear yellow | <175 | 6 | hazy brown |
| 4 | | 2 | 8 | translucent brown | 175 | 9 | clear brown |
| 5 | | 2 | 10 | white + brown opaque | 175 | 12 | translucent brown |
| 6 | | 29 | 59 | hazy brown | 175 | 6 | hazy brown |

TABLE 7-continued

Melt Behaviour of TPU

| TPU | Melt Flow Rate 180° C./ 5 kg | Melt Flow Rate 200° C./ 5 kg | Melt Flow Rate 200° C./ 12.5 kg | Appearance as made | Milling conditions | | |
|---|---|---|---|---|---|---|---|
| | | | | | Minimum temperature ° C. | Mill time at minimum temperature min | Appearance after milling |
| 7 | | 55 | | clear dark brown | <175 | 7 | hazy brown |
| 8 | | 50 | | clear dark brown | 175 | 6 | hazy brown |
| 9 | | 1 | | hazy brown | 175 | 6 | hazy brown |
| 10 | | 1 | | hazy/opaque yellow | >175 | 6 | hazy brown |
| 11 | | <1 | | translucent yellow | >175 | 7 | hazy brown |
| 12 | | 19 | | clear brown | 175 | 9 | clear brown |
| 13 | | 2 | | clear brown | 185 | 6 | clear brown |
| 14 | | 1 | | clear brown | 185 | 5 | clear brown |
| 15 | | <1 | 1 | translucent brown | 185 | 11 | hazy brown |
| 16 | | 0 | 0 | translucent brown | 197 | 10 | hazy brown |
| 17 | | 0 | | white & brown opaque | 197 | 10 | translucent brown |
| 18 | >50 | >40 | | clear brown | 165 | 4 | clear brown |
| 19 | 5 | 45 | | clear brown | 165 | 4 | clear brown |
| C5 | | 1 | 2 | white/yellow opaque | >200 | 5 | hazy brown |
| C6 | | 0 | 1 | white/yellow opaque | — | — | — |
| C7 | | 0 | 4 | 10 | white/yellow opaque | 200 | 5 | hazy brown |
| C1 | | 8 | | white opaque | >200 | 5 | hazy brown |
| C2 | <1 | 13,17 | 25 | white opaque | 175 | 5 | clear brown |

(vi) Milling Temperature of TPU

This was determined on a miniature rubber mill—the "Troester WNK1"—of roll length 240 mm and roll diameter 95 mm. Rotation speeds of front and rear rolls were 22 and 26 rpm respectively. The rolls were heated electrically to the specified temperature. Approximately 100 g of TPU plus 0.5 g "Irganox 565" antioxidant were fed into the "nip" between the two rolls and heated for approximately one minute before the rolls were rotated. When the TPU melted, it spread as a continuous layer over one of the rolls. The gap between the rolls was then increased to about 2 mm and the resulting sheet of TPU cut from the rolls to be subsequently compression moulded. If the mill temperature is too low, the TPU does not melt, but is reduced to a powder. If the temperature is too high, the TPU has the consistency of butter and a sheet of material cannot be pulled off the roll. Results are provided in Table 7.

(vii) Tensile Strength of TPU

Films were prepared for tensile testing by dissolving (selected) TPU's in a 90/10 (by weight) mixture of THF and dimethylacetamide. 10% by weight of the TPU was dissolved in the solvent mixture by rolling for 24 hours at ambient temperature. Once clear solutions were formed, the solutions were poured into pans and the solvent was allowed to evaporate over a period of 48 hours at ambient temperature. Because the vapour pressure of dimethyl acetamide is low at ambient temperature, solvent evaporation was completed by heating the pans to 100° C. in a vacuum oven for three hours. However, this process also anneals the samples. This results in a stiffer sample, i.e. the stress at 50%, 100% and 200% strain will be higher than from a melt pressed sample. Results are provided in Table 8.

TABLE 8

| Example | Tensile Strength (MPa) | Elongation at Break (%) | Stress at 50% Strain (MPa) | Stress at 100% Strain (MPa) | Stress at 200% Strain (MPa) | Stress at 300% Strain (MPa) | Stress at 400% Strain (Mpa) |
|---|---|---|---|---|---|---|---|
| 16 | 35.4 | 560 | 7.5 | 10 | 13.6 | 17.4 | 22.3 |
| 4 | 24.3 | 745 | 2.5 | 4.0 | 6.4 | 8.5 | 10.9 |
| C5 | 16.8 | 890 | 2.3 | 3.6 | 5.5 | 7.1 | 8.6 |
| C7 | 11.1 | 344 | 2.5 | 4.3 | 7.4 | 9.9 | — |

Comparative Examples

Preparation of Polyurethane Elastomers

Example C1

In the following examples the amounts of reactants and other details of the procedures are provided in Tables 1, 2, 5, 6 and 7.

A prepolymer of the polyurethane elastomer was made in a Buchi reactor which is a glass-sided reactor with a metal base plate, both of which were heated to 70° C. prior to addition of the reactants. The anchor stirrer of the reactor reached to the base of the reactor and extended up to two-thirds of the reactor height. To make the prepolymer, the selected amount of MDI was first melted in the base of the reactor and the L-2203 at 70° C. added over 60 minutes with constant stirring at 500 r.p.m. The prepolymer reaction was subsequently completed by heating with stirring at 90° C. for 30 minutes. The clear prepolymer had a viscosity at 50° C. of 50 Pas, as determined by a Brookfield viscometer type "IV1". 96.25 g of this prepolymer (90° C.) were subsequently mixed with 3.66 g BD (23° C.) using a paint mixer. After 90 seconds mixing at 2000 r.p.m., the reacting system were poured into a mould lined with silicone release paper and cured under nitrogen at 80° C. for 16 hours. This process resulted in the production of a uniform white, opaque elastomer of hard phase content of 20% wt.

Example C2

This was prepared as described in Example C1 except that the L-2203 was added first to the Buchi reactor and the MDI added instantly to the heated long chain diol. For this elastomer, the BEPD chain extender was mixed into the prepolymer in the Buchi reactor for two minutes at 500 r.p.m. and 90° C. prior to pouring into the mould. This procedure resulted in a uniform white opaque elastomer of hard phase content of 30% wt.

Example C3

The procedure of Example C2 was used to try to produce an elastomer using BD as a chain extender. This resulted in the production of inhomogeneous, sticky elastomers.

Example C4

The procedure of Example C1 was followed to try to produce elastomers based on BD as chain extender at the higher hard phase content at 30% wt. However, the result was inhomogeneous, sticky elastomers which contained areas rich in one component and deficient in another.

Examples C5 to C7

Prepolymers were made by adding molten MDI to the heated and stirred L-2203 in a 450 liter stainless steel reactor. At completion of the reaction, the isocyanate contents of the prepolymers produced by this process were close to the theoretical values. When the prepolymer reactions were complete, heated prepolymer and, in the case of BEPD, heated chain extender were pumped to the high shear mixing head. Residence time in this mixing head was approximately 2 seconds, during which time the reactants were intensively mixed by an impeller. The reacting mixture was poured into a polypropylene tray and cured in a circulating air oven. This procedure resulted in the production of a white opaque elastomer.

Analysis of Comparative Examples

Properties of the elastomers were assessed using the procedures described above. Results are provided in Tables 5, 6, 7 and 8.

Discussion

1. The TPU's of the examples of the present invention have the advantage, over materials of the comparative examples of nominally identical formulations but made by other processes, that they are generally soluble in commonly available solvents (comparative Example C2).
2. In general, TPU's of the presented invention exhibit one main peak with molecular weight in the range 50,000 to 200,0000. Compared to the elastomers of the comparative examples, the TPU's of the present invention have relatively low amounts of both low molecular weight material and very high molecular weight material. Elastomers of the comparative examples contain a relatively large proportion of low molecular weight material—i.e. material corresponding to polystyrene molecular weights up to about 17,000. This is particularly true of the elastomers made from relatively insoluble BD chain extender.
3. The melt flow index can be considered a measure of the relative ease of flow of the material under low shear stress.

For nominally identical elastomer formulations, TPU's of the present invention are advantageous over the elastomers in having a significantly lower resistance to flow at elevated temperatures. This facilitates subsequent processing steps such as injection moulding and extrusion.

4. This milling temperature can be considered a measure of the temperature required in subsequent processing, such as injection moulding and extrusion. For nominally identical elastomer formulations, TPU's of the present invention are advantageous over other elastomers of significantly lower processing temperatures. Some of the materials of comparative examples could not be melted at temperatures below which significant degradation of the elastomer occurred.
5. The tensile strengths of the TPUs of the present invention are substantially higher than those of the comparative examples as shown in Table 8. The higher tensile strengths of the TPUs of the present invention are the result of a more homogeneous reaction. Additionally, the process of the present invention produces TPUs of better clarity and solubility.

We claim:

1. A method of manufacturing a thermoplastic polyurethane (TPU), comprising:
   reacting a hydrogenated polydiene diol, an isocyanate, one or more chain extenders, and optionally a catalyst in a co-rotating reaction extruder, wherein:
   the hydrogenated polydiene diol has from 1.6 to about 2 terminal hydroxyl groups per molecule and a number average weight of at least 500 and less than 20,000; and
   the isocyanate has two isocyanate groups per molecule.
2. The method according to claim 1 wherein said extruder is a co-rotating multiple-screw extruder.
3. The method according to claim 1 wherein said TPU has a tensile strength of at least 20 MPa.
4. The method according to claim 1 wherein the temperature in the co-rotating reaction extruder does not exceed 240° C.
5. The method according to claim 1 wherein substantially no solvent is present in the co-rotating reaction extruder.
6. The method according to claim 1 wherein all, or part, of the isocyanate is reacted with the polydiene diol to form a prepolymer before feeding into the co-rotating reaction extruder.
7. The method according to claim 1 wherein the polymer backbone of the polydiene diol is the hydrogenated polymerized product of butadiene or isoprene and optionally contains styrene as a comonomer.
8. The method according to claim 7 wherein the degree of hydrogenation is greater than 90%.
9. The method according to claim 1 wherein the polydiene diol is based on polybutadiene and wherein the vinyl content is between 30 and 70%.
10. The method according to claim 1 wherein the number of hydroxyl groups in the polydiene diol is between 1.8 and about 2.
11. The method according to claim 1 wherein the functionality of the isocyanate is in the range 1.9 to 2.1.
12. The method according to claim 1 wherein the isocyanate is 4,4[1]-diphenylmethane diisocyanate.
13. The method according to claim 1 wherein the chain extender or mixture of chain extenders are dihydroxy or diamine compounds of molecular weight less than 300.
14. The method according to claim 1 wherein the molar ratio of the isocyanate (NCO) moieties in the reactants to hydroxyl (OH) and amine ($NH_2$) moieties in the reactants is at least 0.8 and is less than 1.2.
15. The method according to claim 1 wherein an amine or organometallic catalyst is present in the range of 0.005 to 2 wt % based on the total reactant weight.
16. A method of manufacturing a thermoplastic polyurethane (TPU) with a tensile strength greater than 20 MPa comprising:

(i) reacting a hydrogenated polybutadiene diol having from 1.9 to 2 terminal hydroxyl groups per molecule, a vinyl content of between 30 and 70% and a number average weight of at least 1000 and less than 10,000 with an isocyanate having two isocyanate groups per molecule to form a prepolymer; and (ii) feeding this prepolymer along with a dihydroxy chain extender and optionally a catalyst into a co-rotating twin screw reaction extruder wherein the prepolymer and the chain extender react to form the TPU.

17. A thermoplastic polyurethane prepared by the method of claim 1.

18. A thermoplastic polyurethane prepared by the method of claim 16.

* * * * *